United States Patent Office 3,412,054
Patented Nov. 19, 1968

3,412,054
WATER-DILUTABLE POLYURETHANES
Charles L. Milligan, South Charleston, and Kenneth L. Hoy, St. Albans, W. Va., assignors to Union Carbide Corporation, a corporation of New York
No Drawing. Filed Oct. 31, 1966, Ser. No. 590,476
7 Claims. (Cl. 260—18)

ABSTRACT OF THE DISCLOSURE

Water dilutable polyurethanes are prepared by reacting an amine or ammonia with a urethane polymer containing free carboxyl groups. Said urethane polymer is prepared by reacting an organic polyisocyanate with a 2,2-di(hydroxymethyl)carboxylic acid. The water-dilutable polyurethanes are useful as surface coatings and printing inks.

---

The invention relates to water-dilutable polyurethanes that have wide utility as surface coatings, printing inks, and the like. In a particular aspect, the invention relates to urethane polymers that are produced from polyols that contain carboxylic acid groups that are substantially unreactive toward isocyanates so that the said urethane polymers contain free carboxylic acid groups that can be neutralized to impart water-dilutability to the polymer.

Water-dilutable surface coating compositions are highly useful for several reasons. First, it is economical to use water as part of the solvent in any polymer composition. A second reason is that there is considerably less air pollution when water comprises a substantial portion of the volatile solvent that is given off when a coating dries. A third reason is that it is convenient to use a water-dilutable paint or varnish because the solvent that is used to thin the material is readily available. Also, it is much easier to wash brushes and paint spatterings when the paint is water-dilutable than when it is necessary to use turpentine, mineral spirits, or other organic solvent to clean the paint.

It has been known to make water-dilutable polymer systems by preparing polymers that have free carboxylic acid groups which are reacted with an amine to form a water-dilutable system. However, it is not so easy to prepare a polyurethane that has free carboxylic acid groups for the reason that the isocyanate that is a necessary component in any polyurethane system is quite reactive with carboxylic acid groups. For this reason, attempts to prepare polyurethanes containing free carboxylic acid groups have been generally unsuccessful. This invention is based upon the discovery that 2,2-hydroxymethyl-substituted carboxylic acids can be reacted with organic polyisocyanates without any significant reaction occurring between the carboxylic acid groups and the isocyanate. Therefore, urethane polymers prepared from such 2,2-hydroxymethyl-substituted carboxylic acids will contain free carboxylic acid groups. These carboxylic acid groups can then be neutralized with ammonia or an amine to form a water-dilutable polymer having wide utility in the preparation of paints, varnishes, and the like, as is discussed below.

The acids that are employed in the invention are readily available. They can be prepared from an aldehyde that contains at least two hydrogens in the alpha position. Such aldehydes are reacted in the presence of a base catalyst with two equivalents of formaldehyde to form a 2,2-hydroxymethyl aldehyde. The aldehyde is then gently oxidized to the acid by known procedures. The acids that are employed in the invention can be represented in simplification by Formula I:

I 

wherein R represents hydroxymethyl, hydrogen, or alkyl of up to 20 carbon atoms and preferably up to 8 carbon atoms.

Specific illustrative examples of acids that are employed in the invention include 2,2-di(hydroxymethyl) acetic acid, 2,2,2-tri(hydroxymethyl)acetic acid, 2,2-di-(hydroxymethyl)propionic acid, 2,2-di(hydroxymethyl) butyric acid, 2,2-di(hydroxymethyl)pentanoic acid, and the like. The preferred acid is 2,2-di(hydroxymethyl) propionic acid.

The acid can be incorporated into a urethane polymer system by conventional procedures. For example, the acid can be reacted with an organic polyisocyanate and, if desired, one or more additional active hydrogen-containing compounds. Such additional active hydrogen containing compounds include polyols and various carboxylic acids which react with organic polyisocyanates. The nature of the additional active hydrogen-containing compounds that can be used is dependent, in part, upon the end-use intended for the polymer. For example, a useful embodiment of the invention resides in air-drying surface coatings wherein drying oils or derivatives thereof have been incorporated in the polymer.

Air-drying systems can be prepared from a polymer obtained by reacting an organic diisocyanate, a 2,2-di-(hydroxymethyl)carboxylic acid, one or more additional polyols if desired, and an olefinic compound such as a drying oil derivative that contains active hydrogen.

Among the organic diisocyanates that can be employed in the invention are tolylene diisocyanate, bis(4-isocyanatophenyl)methane, xylylene diisocyanate, bis(2-isocyanatoethyl) fumarate, bis(2-isocyanatopropyl) fumarate, bis(2-isocyanatoethyl) carbonate, decahydro-8-methyl-1,4-methanonaphthalene-2(or 3),5-ylenedimethylene diisocyanate, hexahydro-4,7-methanoidan-1(or 2),5(or 6)-xylenedimethylene diisocyanate, hexahydro-4,7-methanoidan-1(or 2),5(or 6)-ylenediethylene diisocyanate (the preparation of the last three compounds is disclosed in the copending application of Brotherton et al., Ser. No. 498,091, filed Oct. 19, 1965), and the like. Tolylene diisocyanate and bis(2-isocyanatoethyl) fumarate are the preferred diisocyanates. Organic triisocyanates and higher polyisocyanates can be used in the invention, if desired. However, it is preferred that higher functionality be imparted to the polymer system by the use of triols or tetrols because the reaction used to prepare the polymer is easier to handle.

Among the additional polyols that can be used to prepare the urethane polymer are the following compositions: ethylene glycol, diethylene glycol, propylene glycol, dipropylene glycol, butylene glycol, glycerol, 1,1,1-trimethylolpropane, 1,1,1-trimethylolethane, 1,2,6-hexanetriol, pentaerythritol, polypropylene glycols having molecular weights of up to about 1000, hydroxyl-terminated polyesters and lactone polymers having molecular weights of up to about 1000, and the like. The low molecular weight (e.g., below about 300 molecular weight) diols and triols are preferred for the air-drying systems.

Among the olefinic derivatives that can be employed are alcohols and carboxylic acids that contain at least one, and up to three or more, olefininc double bonds and which contain at least 4, and preferably at least 8, carbon atoms. Olefinic alcohols that can be used include oleyl alcohol, linoleyl alcohol, linolenyl alcohol, and the like. For economic reasons, it is generally preferred to use olefinic fatty acids. Suitable olefininc fatty acids include those containing up to 22 carbon atoms such as 2-butenoic acid, 3-pentenoic acid, 2-hexenoic acid, 2,4-hexendioic acid, 4-octenoic acid, 2,4-decadienoic acid, stillingic acid, $\Delta^9$-dodecylenic acid, petroselinic acid, vaccenic acid, linoleic acid, palmotoleic acid, linolenic acid, eleostearic acid, punicic acid, licanic acid, arachidonic acid, cetolec acid and the like. It is particularly advantageous for purposes of economy to employ mixtures of acids, particularly those derived from natural sources such as dehydrated castor oil, cottonseed oil, linseed oil, otticac oil, perilla oil, olive oil, safflower oil, sardine oil, soybean oil, tall oil, tung oil (Chinawood oil), and the like.

The isocyanate is generally employed in an amount sufficient to react with all of the active hydrogen-containing components of the reaction mixture, and in some cases, in a slight excess of that amount. For instance, up to about 5 to 10 percent excess of isocyanate can be employed if desired. (The term "active hydrogen" does not include the carboxyl group hydrogen of the 2,2-di(hydroxymethyl)carboxylic acid since the carboxyl group of said acid does not react with isocyanate under the conditions employed to produce the present urethane polymers.) The proportions of the active hydrogen components can vary over a fairly wide range. For instance, the 2,2-di(hydroxymethyl)carboxylic acid is normally employed in amounts of from 4 to about 15 weight percent of the total reaction mixture. While greater or lesser amounts can be used, when less is used the amine-neutralized polymer begins to lose water-dilutability, and when more is used the polymer starts to become uneconomical. The proportion of olefinic compound (drying oil derivative) employed will depend many factors, such as degree of flexibility desired in the coating, nature of the components, and the like. Chemists skilled in the coating art know generally how to determine the amount of drying oil that is needed, and the skill is applicable to this invention. The remainder of the polymer-forming mixture is composed of the additional polyol that is employed if desired.

The polymer is prepared by conventional procedures. For example, the active hydrogen components can be charged to a suitable reaction vessel equipped with stirrer, condenser, heat transfer means, and the like. It is usually desirable to employ an inert solvent such as acetone, ethoxyethyl acetate, or the like. The isocyanate is then charged and the mixture is heated to, for example, 50° to 120° C., until all of the isocayanate has reacted. Of course, the reaction mixture should be substantially anhydrous, and it is desirable to carry out the reaction in an inert atmosphere of nitrogen, or the like, in order to prevent premature polymerization of the olefinic compound and reaction of moisture with isocyanate.

If desired, catalysts such as dibutyltin dilaurate, stannous octoate, and the like, can be employed to accelerate the reaction of isocyanate with the other components. At the completion of the reaction (which usually takes from about 2 to about 8 hours, depending on temperature, presence or absence of catalysts, and the like), the polymer can be recovered by removing the inert diluent by distillation and then adding cosolvent, water, and amine as is discussed more fully below.

In another aspect of the invention, there is provided water-dilutable polymers that can be employed to prepare coatings that are cured by baking or simply by evaporation of solvent. Such polymers are prepared generally from organic diisocyanates and diols reacted in essentially stoichiometric amounts. One or more of the diols will preferably be a diol of fairly high molecular weight (e.g., about 300 to 1000) such as polypropylene glycol, a polyester, or a polylactone diol. Such polymers do not normally contain an olefinic compound, however, the production of the polymers used in this aspect of the invention is otherwise analogous to the process described above.

Novel water compatible adducts are then prepared from the polyurethane polymer having pendant carboxyl groups by modifying these pendant carboxyl groups with a water soluble cation to create a hydrophilic carboxylic acid salt.

One method of "water solubilization," i.e., of rendering the polymer water compatible, is by creating the quaternary ammonium salts by the reaction of the pendant carboxylic groups with ammonia or an amine under aqueous conditions. These quaternary salts furnish a multiplicity of hydrophilic sites in the polymer itself to render the urethane polymer water-compatible if not water-soluble. By water-compatibility is meant that the polymer, although not miscible with water in all proportions, can be solubilized in a mixture of water and a cosolvent to provide a solution containing approximately 40 percent resin solids, and may thereafter be diluted down with water to a solution containing 5 percent resin solids.

The quaternary ammonium salt of the urethane polymer is produced by reacting the free carboxyl groups of the polymer with an aqueous solution of a compound such as ammonia or an amine under aqueous conditons. Following the water-solubilization with ammonia or amine, the desired urethane polymer would therefore have pendant hydrophilic quaternary groups of the structure:

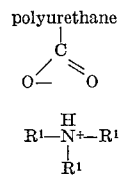

wherein each $R^1$ represents hydrogen, an organic radical, or in the case of cyclic amines two $R^1$ substituents taken together may form an alkylene or heteroalkylene chain.

Suitable amines are water-soluble primary, secondary, and tertiary amines which will produce the desired hydrophilic quaternary ammonium group. The amines may be otherwise substituted so long as the substituents do not adversely react with any of the components in the system. Accordingly, alkanolamines, dialkanolamines and the like are suitable since they are for the most part water-soluble and since the hydroxyl substituent will not tend to form an ester with the free carboxyl groups in the aqueous medium.

The hydrophilic quaternary ammonium groups lend water-compatibility to the urethane polymers of this invention. However, when the ultimate coating composition is applied, the amine evaporates during the drying process to leave a water-insoluble resin film as the coating. Thus it is obvious that for an air drying coating the amines to be employed must have vapor pressures sufficiently high to permit drying of the coating within a reasonable period of time. For such air drying coatings desirable amines are those which possess a boiling point of less than about 180° C. at 760 millimeters of mercury pressure. Highly suitable are amines boiling below about 80° C. Of course, if a heat-curable coating is desired, obviously the vapor pressure of the amine would be immaterial and it would be necessary only to employ an amine having a boiling point lower than the boiling point or the char point or the resin which forms the coating.

Compounds which are suitable for reaction with the carboxyl groups to produce a hydrophilic quaternary ammonium group include ammonia, amines such as the primary, secondary and tertiary amines, including alkanolamines, polyamines such as diamines and triamines, cyclic amines such as the morpholines, piperazines, and the like which are water-soluble, and in the case where employed for air drying coatings, amines which will produce a coating that will dry within a reasonable period of time.

Typical amines are primary alkylamines such as ethylamine, diethylamine, propylamine, isopropylamine, butylamine, amylamine, methylbutylamine, dimethylamine and trimethylamine (these latter two compounds are difficult to handle being gases), dimethylaminopropylamine, diethylaminopropylamine, ethylenediamine, diethylenetriamine, propylenediamine, 1,3-diaminopropane, N,N,N', N' - tetramethylbutanediamine, monoethanolamine, N-methylethanolamine, N-ethylethanolamine, N,N-dimethylethanolamine, N,N-diethylethanolamine, N-aminoethylethanolamine, monoisopropanolamine, morpholine, 2,6-dimethylmorpholine, N - methylmorpholine, N - ethylmorpholine, piperazine, N-methylpiperazine, N-hydroxyethyl piperazine, N-aminoethyl piperazine. A wide variety of other amines may be employed including mixtures of amines if they are water soluble and will form the quaternary ammonium salt with a carboxyl group in aqueous solution. However, in the formulation of a marketable and commercially desirable product, qualities such as the toxicity and the odiferousness of the amine are of primary importance. For example, an amine such as cadaverine (1,5-pentanediamine) would be satisfactory from a chemical standpoint, but if incorporated in a coating would create a highly undesirable odor as the coating dries.

It will be obvious that upon obtaining the urethane polymer having pendant carboxyl groups, that these carboxyl groups could be rendered hydrophilic by a method other than by creation of the quaternary ammonium salt, though this method is here preferred. For example, reaction of the carboxyl groups with an alkali metal hydroxide will result in the formation of the alkali metal salt, which is a hydrophile. The alkali metal salts are extremely basic and would raise the pH of the polymer solution considerably. However, a highly alkaline solution causes additional hydrolytic attack upon the urethane groups of the urethane polymer, itself thus degrading the basic resin portion of the coating. Minor amounts of an alkali metal hydroxide, preferably less than 25 percent of the stoichiometric equivalency of carboxyl groups of the polymer, may be tolerated. At times, a small amount of alkali metal hydroxide, e.g., sodium or potassium hydroxide, is advantageous in promoting the quaternary reaction.

To obtain optimum solubility of the urethane polymer there is employed sufficient amine (and alkali metal hydroxide if employed) to react with at least all the free carboxyl groups in the polymer. Therefore, preferably there is added an amount of the amine and hydroxide stoichiometrically equivalent to the amount of 2,2-di(hydroxymethyl)carboxylic acid in the urethane polymer. The use of less than the stoichiometric equivalence of amine is not normally desirable. Generally, an excess of amine is preferred and preferably up to 50 percent excess based on the weight of the stoichiometric requirement of amine is employed. Preferably about 10 percent by weight excess based on the weight of the stoichiometric requirement of amine is employed. It has been found that addition of excess amine improves the water compatibility of the urethane polymer. But concurrently, the presence of excess amine tends to raise the pH, increasing the hydrolytic attack upon the urethane groups and ester groups of the polymer, and also tends to result in an ultimate coating having a longer drying time.

The addition of the amine is accomplished by simply adding an aqueous solution containing the amine and stirring into the urethane polymer. The amine addition may be effected over a broad range of temperatures from ambient temperature up to 100° C.

The amine is preferably added as a solute in sufficient water to assure the formation of the quaternary ammonium salt of the free carboxyl groups of the polymer rather than the amide. Generally, at least an equimolar amount of water based on the amine is employed. More commonly, for facility in formulation, the amine is added as about a 50 percent solution in water.

The addition of the amine renders the urethane polymer compatible with water and usually the water-compatible adduct will form a solution with the relatively small amount of water added with the amine. Despite the formation of hydrophiles, e.g., quaternary ammonium groups, the water-compatible urethane polymer hereinafter called the "neutralized resin," is not miscible with water in all proportions. However, in formulating a water-based coating it is necessary to provide a resin solution of the neutralized resin which may be diluted with water down to application viscosity, and more desirably to provide a resin solution which is capable of even extreme dilution with water, down to a solution containing 5 percent or less of resin solids, i.e., the neutralized resin. The extreme dilutability facilitates formulation of a wide variety of coatings and also enables brush cleaning with water alone following application of the coating. To obtain such water-dilutable solutions, it is necessary to employ an organic cosolvent to increase the solubility of the neutralized resin in water.

In preparing a coating, the organic cosolvent is generally added to the neutralized resin (containing the water added during the amine addition) in sufficient amount to permit further dilution with water alone to application viscosity without causing the neutralized resin to come out of solution. More preferably, enough cosolvent should be added to permit dilution to a solution containing no more than 5 weight percent neutralized resin, without causing the neutralized resin to come out of solution. Accordingly, it is convenient to provide a coatings vehicle already containing the organic cosolvent, which vehicle may be subsequently modified with pigments, colorants, and driers, and may be diluted to the desired application viscosity with water alone without danger of precipitating the neutralized resin from solution. It is at times desirable to add the cosolvent prior to addition of water and amine.

Useful organic cosolvents are identified by high solubilities for both water and the neutralized resin. The necessary properties of suitable organic solvents may be readily ascertained following a consideration of the ternary miscibility data of the neutralized resin-solvent-water system. In general, upon addition of the aqueous amine solution to the urethane polymer there is obtained a solution, or a mixture, containing a predominant amount of neutralized resin and a minor amount of water. The organic cosolvent is added to this system in an amount sufficient to produce a single liquid phase comprising the neutralized resin, the cosolvent and the water, and moreover, in sufficient amount to maintain this single liquid phase upon subsequent dilution of the neutralized resin solution with water to the concentration desired for application. As hereinabove pointed out it is highly desirable to add sufficient cosolvent as to enable even extreme dilution with water, down to 5 percent neutralized resin on solution. The amount of cosolvent which must be added to the neutralized resin will depend upon the particular ternary system. A prime consideration is the water-compatibility of the neutralized resin, i.e., the number of hydrophilic moieties introduced into the polyester-carboxylic acid adduct by addition of the amine. Generally, the addition of from about 0.15 to about 2 parts by weight of cosolvent based upon the weight of the neutralized resin is sufficient to enable subsequent dilution with water down to a concentration of 5 percent neutralized resin. More preferably, admirably suitable coatings contain from 0.25 to 1 part by weight of cosolvent based on the weight of the neutralized resin. However, the amount of cosolvent to be added in each particular instance may be dictated by additional factors other than solubility. For example, if drying characteristics or viscosity of the coatings are of prime importance, the choice and amount of cosolvent to be employed may be accommodated to achieve this objective. Mixture of fast evaporating and slow evaporating cosolvents are useful to provide coatings which set in a fairly short time but do not dry completely so quickly as to afford an unduly short lap time during which retouching can be effected without marring the uniformity and color of the coating finish. Such retarding of rapid dry also affords improved brush cleansibility. In such formulations the slow evaporating cosolvent, called a retarder, is usually employed in amounts ranging from about 0.05 to 0.5 parts by weight based upon the weight of the neutralized resin. It is pointed out that an increase of cosolvent, an excess of that needed to permit subsequent dilution of the neutralized resin with water will result in a decrease in viscosity of the ultimate coating.

Typical cosolvents which may be employed demonstrate a high solubility in water, over about 90 percent, and a high solubility for the neutralized resin. In all instances, however, the ternary miscibility of the solvent characteristics of the solvent on the neutralized resin-solvent-water system will permit dilution to a solution of 5 percent neutralized resin or less while maintaining a single continuous phase. Suitable cosolvents include the alkylene glycol monoalkyl ethers such as methoxyethanol, ethoxyethanol, propoxyethanol, butoxyethanol, methoxypropanol, ethoxypropanol, propoxypropanol, butoxypropanol, the methyl ethers of butylene glycol and of hexylene glycol; the dialkyl ethers of alkylene glycol and such as dimethoxyethane, the alkyl and dialkyl ethers of diethylene glycol such as the methyl, ethyl, propyl and butyl ethers of diethylene glycol, e.g., butyl carbitol, and the dimethyl and diethyl ethers of diethylene glycol; the cyclic ethers such as tetrahydrofuran and dioxane; diacetone alcohol and the like. The alkylene glycols, such as butylene glycol, have suitable solubility characteristics but by virtue of their high boiling points would result in air-drying coatings having an extended drying time though this would not preclude their use in bake-dry coatings. These high boiling compounds can be used in small amounts with other cosolvents as retarders. Of course in formulating an ultimate composition, physical qualities such as odor, toxicity, and flammability are of prime importance, and choice of the cosolvent will often be dictated by such characteristics. It will be obvious that a wide variety of solvents which increase the solubility of the neutralized resin in water can be used in formulating coatings within the scope of this invention. The water-compatibility of the neutralized resins of this invention will enable their use with a broad range of solvents to obtain fast or slow drying industrial or consumer coatings. Usually for air drying coatings it is desirable to utilize a primary cosolvent or mixture of cosolvents boiling at a temperature of less than about 200° C. As pointed out above the primary cosolvents may be used in conjunction with a high boiling retarder, e.g., a solvent boiling at a temperature up to 250° C. or higher, to obtain specific drying characteristics.

The neutralized resin vehicles provided herein may be employed in a broad spectrum of coatings such as clear varnishes, high gloss enamels, printing inks, flat interior wall paints, and the like. The vehicles may be used as the sole film former in the coating compositions or in combination with vinyl type latexes, if desired. Formulation of paints from the neutralized resin vehicles may be conveniently accomplished in standard paint manufacturing equipment ordinarily employed in the industry for oil or water based formulations. The pigment dispersion in the resin solution may be accomplished by means of a roll mill, a ball mill, a sand mill or the like. Ball mill dispersion often results in excessive foamings and hence is not preferred.

The paint compositions formulated in accordance with this invention utilize the novel neutralized resin as the primary non-volatile binder, or film former, of the coating. Although, as pointed out, the amine portion of the neutralized resin will slowly evaporate from the coating during the drying process, the neutralized resin is deemed a non-volatile component. The total non-volatile volume of a paint composition is the sum of the pigment or extender and the non-volatile binder which may comprise the novel neutralized resin alone or in combination with a vinyl type latex or other binder. Suitable latexes are dispersions of plastic semi-solids such as butadiene-styrene copolymer, polystyrene in both preplasticized and post-placticized systems, polyvinyl acetate and the like. Water and the cosolvent form the main volatile components of the paint composition. In addition to the volatile and non-volatile components, the novel ultimate paint compositions of this invention contain a metallic drier when air drying coatings are prepared.

Accordingly, the novel neutralized resins can be employed in paint compositions using various components otherwise known in the art. Formulation methods similar to those of the art may also be employed. The neutralized resin may merely be formulated as have been other binders in paint manufacture. In this regard the paints utilizing neutralized resin may be prepared using other well known paint ingredients such as emulsifying agents, dyes, colorants, anti-foaming agents and the like, according to the ultimate properties desired and the properties of the paint which are encountered.

The neutralized resins may be employed in conjunction with a wide variety of opacifying and extending pigments to produce a wide variety of paint formulations. It is preferred, in formulating paints from the neutralized resin solution to employ pigments which are not acid reactive. Such pigments, e.g., zinc oxide, calcium sulfate and the like, tend to crosslink the resin and thicken and ultimately gel the paint. Eminently suitable as opacifying a pigment is titanium dioxide, ferric oxide, and carbon black, and as extending pigments, silica, talc, clay and the like. These pigments may be used in conjunction with colorants such as phthalocyanine green to produce variously colored paints.

As hereinbefore pointed out the compositions of this invention may be employed in high gloss enamels, semi-gloss paints, and interior flat paints. The degree of light reflection of the ultimate paint will be determined primarily by the amount of pigment employed. Pigment volume concentration based on the overall volume of non-volatile vehicle varies from as low as about 10 to about 30 percent for high gloss enamel paints to as high as about 45 to about 65 percent for flat interior wall paints. Semi-gloss finishes may be obtained by using intermediate pigment volume concentrations of from about 30 to about 45 percent. The light reflectance properties however are largely dependent upon the particular pigment employed and the resin vehicle, as will be appreciated by those skilled in the art.

Metallic driers are generally employed in the novel air drying paint compositions of this invention in small amounts sufficient to impart desired drying characteristics. Suitable driers are metallic salts of carboxylic acids, and are known in the art. Typical driers include cobalt, manganese and zirconium salts such as cobalt naphthenate, cobalt linolate, manganese tallate, zirconium octoate, cobalt octoate and the like. For obvious reasons, preferred driers are water soluble or water dispersible. Driers are employed in small amounts depending upon the resin vehicle itself desired drying characteristics. Generally from about 0.005 to about 1 percent by weight of the metal of the drier based on the weight of the neutralized resin composition is employed.

As hereinbefore discussed the neutralized resin solutions of this invention may be diluted with water alone to application viscosity. For example the neutralized resin may be pigmented on a roll mill using only a portion of the neutralized resin to disperse the pigment, and subsequently adding neutralized resin and water to achieve the finished paint composition. The viscosities of the finished paint compositions can be varied depending upon intended use, but usually range from about 50 to 90 Krebs units. It should be noted that if formulating of the final composition is carried out by diluting a pigmented neutralized resin solution, that a parallel formulation without pigment should be examined for clarity to assure complete solubility of the neutralized resin. In this regard, often provision for a small increase in the amount of cosolvent in the formulation recipe will generally restore clarity to the solution.

The example which follow illustrate the invention.

EXAMPLE 1

Reaction of dimethylolpropionic acid with tolylene diisocyanate 2,2-dimethylolpropionic acid, 33.5 grams (0.5 OH eq.), and 120.5 grams of ethoxyethyl acetate were placed in a flask equipped with thermometer, stirrer, reflux condenser, nitrogen purge and heating mantle. The mixture was heated to 60° C. and tolylene diisocyanate, 87 grams (1.0 eq.) was added. The temperature was increased to 80° C. and the solution analyzed at various intervals for both NCO and carboxylic acid content. The results of these analyses are shown below:

(Theoretical NCO Content at Zero Time=17.42%)

| Time (after NCO addition) | Percent NCO | Acid No. |
|---|---|---|
| 56 minutes | 9.17 | 158.9 [1] |
| 86 minutes | 8.72 | 59.5 |
| 116 minutes | 8.83 | 59.3 |
| 146 minutes | 8.90 | 59.1 |
| 176 minutes | 8.80 | 58.9 |
| Room temp. overnight, heated to 80° C | | 59.3 |
| Added dibutyltin dilaurate catalyst (0.03%) | | |
| 60 minutes (after catalyst addition) | | 57.5 |
| 80 minutes (after catalyst addition) | | 57.3 |
| 140 minutes (after catalyst addition) | | 56.8 |

[1] (Theo.=53.2).

No $CO_2$ evolution was noted during the experiment.

EXAMPLE 2

Reaction of soya acid with tolylene diisocyanate

Soya acid, 70.6 grams (0.25 eq.), neopentyl glycol, 26.0 (0.5 eq.), and ethoxyethyl acetate, 62.4 grams, were placed in a 4-necked flask equipped with thermometer, stirrer, reflux condenser, nitrogen purge and heating mantle. The mixture was heated to 60° C. and tolylene diisocyanate, 87 grams (1.0 eq.), was added. The solution analyzed at various intervals for both NCO and carboxylic acid content. The results of these analyses are shown below.

(Theoretical NCO Content at Zero Time=17.05%)

| Time (after NCO addition) | Percent NCO | Acid No. |
|---|---|---|
| 10 minutes | 8.42 | 157.8 [1] |
| 40 minutes | 7.82 | 52.5 |
| 70 minutes | 7.76 | 49.3 |
| 100 minutes | 7.48 | 46.8 |
| 150 minutes | 7.00 | 42.9 |
| 250 minutes | 6.98 | 40.5 |

[1] (Theo.=57.0).

Evolution of $CO_2$ was evident throughout the experiment.

EXAMPLE 3

To a flask equipped with thermometer, stirrer, reflux condenser, Dean Stark trap, feed tank and nitrogen purge was added trimethylolpropane (145 grams, 1.083 moles), 2,2-dimethylolpropionic acid (117 grams, 0.873 mole), safflower fatty acids (452 grams, 1.65 moles) and xylene (100 grams). The reaction mixture was heated to 160° C. for 1.25 hrs. during which time 23 ml. of water were removed. The acid number at this time was 88.0. The xylene was removed under reduced pressure and the reaction mixture cooled to 80° C.

Enough acetone was added from the feed tank to maintain a gentle reflux at 75°–80° C. Tolylene diisocyanate (278 grams, 1.6 moles) was added dropwise from the feed tank over a sixty-minute period. The temperature was maintained at 75°–80° C. an additional sixty minutes and then dibutyltin dilaurate (0.29 gram) was added. Heating was continued an additional fifty minutes, after which time an infrared spectrum of the reaction solution indicated completion of the hydroxyl-isocyanate reaction.

A mixture of n-propoxypropanol (306 grams) and n-butyl ether of diethylene glycol (76 grams) was added and the acetone removed under reduced pressure. Dimethylethanolamine (107 grams) was added and the reaction mixture was diluted with water (834 grams). The diluted vehicle had the following properties:

| | |
|---|---|
| Acid numbers | 70.5 |
| Total solids | 38.4±1% |
| Gardner viscosity | $Z_4$–$Z_5$ |
| Gardner color | 4 |

A six-mil wet film containing 0.11% cobalt drier was cast on bonderized steel and allowed to cure for seven days at room temperature. The film dried to a paper free state in 7.5 hours and had a 7-day Sward hardness value of 20.

A sample of the vehicle was pigmented with $TiO_2$ R–901 to a pigment volume concentration (PVC) of approximately 40%. A seven-mil wet film containing 0.11% cobalt drier was cast on plate glass and allowed to cure for thirty days at room temperature. The film dried to a paper free state in 3.5 hours and had a 30-day Sward hardness value of 20.

EXAMPLE 4

To a flask equipped with thermometer, stirrer, reflux condenser, Dean-Stark trap, feed tank and nitrogen purge was added trimethylolpropane (24.3 grams, 0.181 mole), 2,2-dimethylolpropionic acid (30.6 grams, 0.228 mole), tall oil fatty acids (103.2 grams, 0.361 mole) and toluene (100 grams). The reaction mixture was heated to 170° C. and 6.5 ml. of water removed as an azeotrope with toluene. This water removal required approximately 1.75 hours at 170° C. The toluene was removed under reduced pressure and the reaction mixture cooled to 75–80° C.

Enough acetone was added from the feed tank to maintain a gentle reflux at 70° C. Tolylene diisocyanate (51.3 grams, 0.295 mole) was added dropwise from the feed tank over a 15-minute period. The temperature was maintained at 75°–80° C. an additional 60 minutes and then dibutyltin dilaurate (.061 gram) was added. Heating was continued an additional three hours, after which time an infrared spectrum of the reaction solution indicated completion of the hydroxyl-isocyanate reaction.

A mixture of n-propoxypropanol (64.3 grams) and n-butyl ether of diethylene glycol (16.1 grams) was added and the acetone removed under reduced pressure. Dimethylethanolamine (18.8 grams) was added and the reaction mixture was diluted with water (175 grams). The diluted vehicle had the following properties:

| | |
|---|---|
| Acid number | 62.8 |
| Total solids, percent | 38.4 |
| Gardner viscosity | X |
| Gardner color | 5 |

A 6-mil wet film containing 0.11% cobalt drier was cast on bonderized steel and allowed to cure for seven days at room temperature. The film dried to a paper free state in less than six hours and had a 7-day Sward hardness value of 16.

EXAMPLE 5

To a one-liter flask equipped with thermometer, stirrer, reflux condenser, Dean-Stark traps, feed tank and nitrogen purge was added a triol of the formula

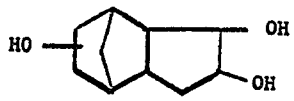

(38.2 grams, 0.544 eq.), 2,2-dimethylolpropionic acid (30.6 grams, 0.228 mole), tall oil fatty acids (103.2 grams, 0.361 mole) and toluene (100 grams). The reaction mixture was heated to 170° C. and 6.5 ml. of water removed as an azeotrope with toluene. The toluene was then removed under reduced pressure and the reaction mixture cooled to approximately 70° C.

Enough acetone was added from the feed tank to maintain a gentle reflux at 70° C. Tolylene diisocyanate (51.2 grams, 0.295 mole) was added dropwise from the feed tank over a thirty-minute period. The temperature was maintained at 65°–70° C. an additional sixty-five minutes. Heating was discontinued overnight. The following morning, the reaction solution was heated to 66° C. and dibutyltin dilaurate (0.065 gram) was added. Heating was continued for 4.25 hours. At the end of this heating period an infrared spectrum of the reaction solution indicated completion of the isocyanate-hydroxyl reaction.

A mixture of n-propoxypropanol (63 grams) and n-butyl ether of diethylene glycol (17 grams) was added and the acetone removed under reduced pressure. Dimethylethanolamine (17.5 grams) was added and the reaction mixture was diluted with water (185 grams). The diluted vehicle had the following properties:

| | |
|---|---|
| Acid number | 59.3 |
| Total solids, percent | 36.0±1 |
| Gardner viscosity | $Z_2$–$Z_3$ |
| Gardner color | 9 |

A 6-mil wet film containing 0.11% cobalt drier was cast on bonderized steel and allowed to cure for seven days at room temperature. The film dried to a paper free state in less than 3.5 hours and had a 7-day Sward hardness value of 28.

EXAMPLE 6

To a flask equipped with thermometer, stirrer, reflux condenser, Dean-Stark trap, feed tank and nitrogen purge was added trimethylolpropane (21.8 grams, 0.163 mole), 2,2-dimethylolpropionic acid (34.2 grams, 0.256 mole), soya fatty acids (99.0 grams, 0.353 mole) and xylene (100 grams). The reaction mixture was heated to 200° C. for approximately 30 minutes, after which time the acid number was found to be 80.0. The xylene was removed under reduced pressure and the reaction mixture allowed to cool to 80° C.

Enough acetone was added from the feed tank to maintain a gentle reflux at 70–80° C. Tolylene diisocyanate (54.5 grams, 0.313 mole) was added dropwise over an approximate fifteen-minute period. The temperature was maintained at 70°–80° C. an additional 85 minutes and dibutyltin dilaurate (0.1 gram) was added. Heating was continued an additional two hours, after which time an infrared spectrum of the reaction solution indicated completion of the hydroxyl-isocyanate reaction.

A mixture of n-propoxypropanol (64.5 grams) and n-butyl ether of diethylene glycol (16.2 grams) was added and the acetone removed under reduced pressure. Dimethylethanolamine (50.2 grams) was added and the reaction mixture was diluted with water (176 grams).

| | |
|---|---|
| Acid number | 56.6 |
| Total solids, percent | 39.5 |
| Gardner viscosity | X |
| Gardner color | 8 |

A six-mil wet film containing 0.11% cobalt drier was cast on bonderized steel and allowed to cure for seven days at room temperature. The film dried to a paper free state in three hours and had a 7-day Sward hardness value of 18.

EXAMPLE 7

To a flask equipped with thermometer, stirrer, reflux condenser, Dean-Stark trap, feed tank and nitrogen purge was added polypropylene glycol of about 425 molecular weight (41.7 grams, 0.1 mole), 2,2-dimethylolpropionic acid (14.4 grams, 0.1 mole), cyclohexane dimethanol (14.4 grams, 0.1 mole) and 1,4-dioxane (30 grams). The reaction mixture was heated to 90° C. and tolylene diisocyanate (50.5 grams, 0.29 mole) was fed dropwise over a twenty-minute period. Heating was continued for three hours at 80°–90° C. and then dibutyltin dilaurate (0.2 gram) was added.

The temperature was raised to 98 C. and held an additional 50 minutes, after which time an infrared spectrum of the reaction solution indicated completion of the isocyanatehydroxyl reaction. A mixture of n-propoxypropanol (37 grams) and n-butyl ether of diethylene glycol (10 grams) was added. Dimethylethanolamine (9 grams) was added and the solution diluted with water (104 grams).

The diluted vehicle had the following properties:

| | |
|---|---|
| Acid number | 46.2 |
| Total solids, percent | 36.1 |
| Gardner color | 2 |
| Gardner viscosity | >$Z_6$ |

A six-mil wet film was baked for 3 hours at 150° F. to give a film with a Sward hardness value of 22.

EXAMPLE 8

To a flask equipped with thermometer, stirrer, reflux condenser, Dean-Stark trap, feed tank and nitrogen purge was added polypropylene glycol of about 425 molecular weight (20.9 grams, 0.10 eq.), 2,2-dimethylolpropionic acid (6.7 grams, 0.05 mole), propylene glycol (3.8 grams, 0.05 mole) and 1,4-dioxane (30 grams). The mixture was heated to 80° C. and tolylene diisocyanate (25.2 grams, 0.145 mole) was fed dropwise from a feed tank over a five-minute period. Heating was continued for twenty minutes and dibutyltin dilaurate (0.16 gram) added. Heating was maintained for 1.25 hours at 80° C. The temperature was then raised to 95° C. for 30 minutes, after which time an infrared spectrum of the reaction solution indicated completion of the hydroxyl-isocyanate reaction. The dioxane was stripped out under reduced pressure and a mixture of n-propoxypropanol (17.4 grams) and n-butyl ether of diethylene glycol (4.5 grams) was added. Dimethylethanolamine (4.5 grams) was added and the solution diluted with water (49 grams).

The diluted vehicle had the following properties:

| | |
|---|---|
| Acid number | 49.1 |
| Total solids, percent | 40.3 |
| Gardner color | 2 |
| Gardner viscosity | W |

A 6-mil wet film was baked 30 minutes at 300° F. to give a film with a Sward hardness value of 36.

What is claimed is:

1. A water-dilutable polymer comprising a quaternary ammonium salt of a urethane polymer containing free carboxyl groups, said urethane polymer comprising the product of a reaction mixture containing
    (a) a 2,2-di(hydroxymethyl)alkanoic acid of the formula

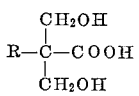

wherein R represents hydroxymethyl, hydrogen, or alkyl of up to 20 carbon atoms, and (b) an organic polyisocyanate, wherein said organic polyisocyanate is employed in at least an amount sufficient to react with all of the active hydrogens in said reaction mixture.

2. The water-dilutable polymer of claim 1 wherein said urethane polymer is produced by reacting an organic diisocyanate with a 2,2-di(hydroxymethyl)alkanoic acid and at least one additional organic polyol.

3. The water-dilutable polymer of claim 1 wherein the 2,2 - di(hydroxymethyl)alkanoic acid is 2,2 - di(hydroxymethyl)-propionic acid.

4. The water-dilutable polymer of claim 1 wherein the quaternary ammonium salt is derived from ammonia or an amine having a boiling point at atmospheric pressure below about 180° C.

5. The water-dilutable polymer of claim 1 wherein the quaternary ammonium salt is derived from dimethylethanolamine.

6. The water-dilutable polymer of claim 5 wherein said urethane polymer is produced by reacting an organic diisocyanate with a 2,2-di(hydroxymethyl)alkanoic acid, at least one additional organic polyol, and a member selected from the group consisting of olefinic alcohols having at least four carbon atoms and olefinic acids having at least four carbon atoms.

7. The water-dilutable polymer of claim 5 wherein said urethane polymer is produced by reacting an organic diisocyanate with a 2,2-di(hydroxymethyl)alkanoic acid, a drying oil acid, and at least one member of the group consisting of organic diols having molecular weights below about 300 and organic triols having molecular weights below about 300.

References Cited

UNITED STATES PATENTS

| | | | |
|---|---|---|---|
| 2,907,719 | 10/1959 | Greenlee | 260—2.5 |
| 2,907,746 | 10/1959 | Greenlee | 260—47 |
| 2,907,747 | 10/1959 | Greenlee | 260—47 |
| 3,264,134 | 8/1966 | Vill et al. | 117—63 |
| 3,294,752 | 12/1966 | Wilkinson | 260—77.5 |

FOREIGN PATENTS

| | | |
|---|---|---|
| 195,581 | 4/1965 | Sweden. |
| 1,006,151 | 9/1965 | Great Britain. |
| 1,043,260 | 9/1966 | Great Britain. |
| 1,066,488 | 4/1967 | Great Britain. |
| 1,076,688 | 7/1967 | Great Britain. |
| 1,080,590 | 8/1967 | Great Britain. |
| 1,086,079 | 10/1967 | Great Britain. |

DONALD E. CZAJA, *Primary Examiner.*

FRED E. McKELVEY, *Assistant Examiner.*